(12) United States Patent
Lee et al.

(10) Patent No.: US 6,966,249 B2
(45) Date of Patent: Nov. 22, 2005

(54) ROTARY ACTUATOR

(75) Inventors: Jae Gyun Lee, Changwon (KR); Ja Bong Jin, Changwon (KR)

(73) Assignee: Dongyang Mechatronics Co., Ltd., Incheon (KR)

( * ) Notice: Subject to any disclaimer, the term of this patent is extended or adjusted under 35 U.S.C. 154(b) by 0 days.

(21) Appl. No.: 10/603,033

(22) Filed: Jun. 24, 2003

(65) Prior Publication Data

US 2004/0134346 A1 Jul. 15, 2004

(30) Foreign Application Priority Data

Jan. 11, 2003 (KR) ................................. 10-2003-0001805

(51) Int. Cl.⁷ .............................................. F16H 37/02
(52) U.S. Cl. ................................................. 92/31; 92/33
(58) Field of Search .............................. 92/136, 31, 33, 92/51; 91/169

(56) References Cited

U.S. PATENT DOCUMENTS

| | | | | |
|---|---|---|---|---|
| 3,165,982 A | * | 1/1965 | Taylor | ............................ 92/33 |
| 4,313,367 A | * | 2/1982 | Weyer | ............................ 92/33 |
| 4,519,263 A | * | 5/1985 | Milberger | ....................... 92/31 |
| 5,671,652 A | * | 9/1997 | Weyer | ............................ 92/33 |
| 6,474,214 B2 | * | 11/2002 | Takeuchi et al. | .............. 92/13.1 |

FOREIGN PATENT DOCUMENTS

| | | | | |
|---|---|---|---|---|
| JP | 58030504 A | * | 2/1983 | ........... F15B/15/06 |
| KR | P2001-0098535 | | 11/2001 | |

* cited by examiner

Primary Examiner—Edward K. Look
Assistant Examiner—Igor Kershteyn
(74) Attorney, Agent, or Firm—Volpe and Koenig, P.C.

(57) ABSTRACT

A rotary actuator including a tube. A piston disposed in the tube and configured for displacement there along. The piston having a spline extending radially outwardly therefrom formed by plurality of grooves and a plurality of non-grooved portions. At least some of the non-grooved portions of the spume defining a passageway extending radially inwardly through a side of the piston. An axle rod disposed in the piston and having a second spline. A set of pins each positioned through a passageway through the piston to engage the second spline.

9 Claims, 6 Drawing Sheets

ROTARY ACTUATOR

BACKGROUND OF THE INVENTION

This application claims the priority of Korean Patent Application No. 2003-1805 filed on 11 Jan. 2003 in the Korean Intellectual Property Office, the disclosure of which is incorporated herein in its entirety by reference.

1. Field of the Invention

The present invention relates to a rotary actuator which has a short length and can rotate at a great rotation angle while supporting a heavy structure.

2. Description of the Related Art

A rotary actuator rotates a platform of a special motor vehicle such as a cherry picker for lifting a person to a high place or is adopted in a heavy equipment to rotate a structure where a predetermined object is installed. Since the rotary actuator not only supports a heavy structure such as a platform or an arm but also is installed in a small space and rotates the heavy structure, the entire length thereof needs to be as short as possible. Thus, a rotary actuator having a shorter length and capable of effectively supporting and rotating a heavy structure is needed.

SUMMARY OF THE INVENTION

To solve the above and/or other problems, the present invention provides a rotary actuator having a short length and capable of supporting a heavy structure and rotating the structure at a great rotation angle.

According to an aspect of the present invention, a rotary actuator comprises a tube having first and second hydraulic ports formed separated a predetermined distance from each other and through which oil enters and is exhausted and at least two tube through holes penetrating a side surface of the tube; an end cap coupled to the tube and having a first flange fixed to a predetermined first platform; an axle rod including a second flange portion disposed at one side of the tube and fixed to a predetermined second platform to be rotated, a slant groove rod disposed in one portion of the tube and having at least two first slant grooves formed inclined on an outer circumferential surface, and an axle rod disposed in the other portion of the tube and sliding coupled to the end cap; a piston including a piston head disposed between the tube and the axle rod and a slant groove body disposed between the tube and the slant groove rod, wherein at least two second slant grooves are formed on an outer circumferential surface of the slant groove body to be opposite to the direction of the first slant groove and at least two piston pin holes are formed at one side of the slant groove body; a first pin installed at the piston pin hole and inserted in the first slant groove; and a second pin including a pin end portion penetrating the tube through hole and inserted in the second slant groove and a pin head formed on the pin end portion to be stepped and inserted in the tube through hole.

The piston pin holes are symmetrical formed in the slant groove body.

The tube through holes are symmetrical formed in the tube.

The rotary actuator further comprises sliding rings installed between the first flange portion and the tube and/or between the second flange portion and the tube.

The rotary actuator further comprises thrust bearings installed between the first flange portion and the tube and/or between the second flange portion and the tube.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
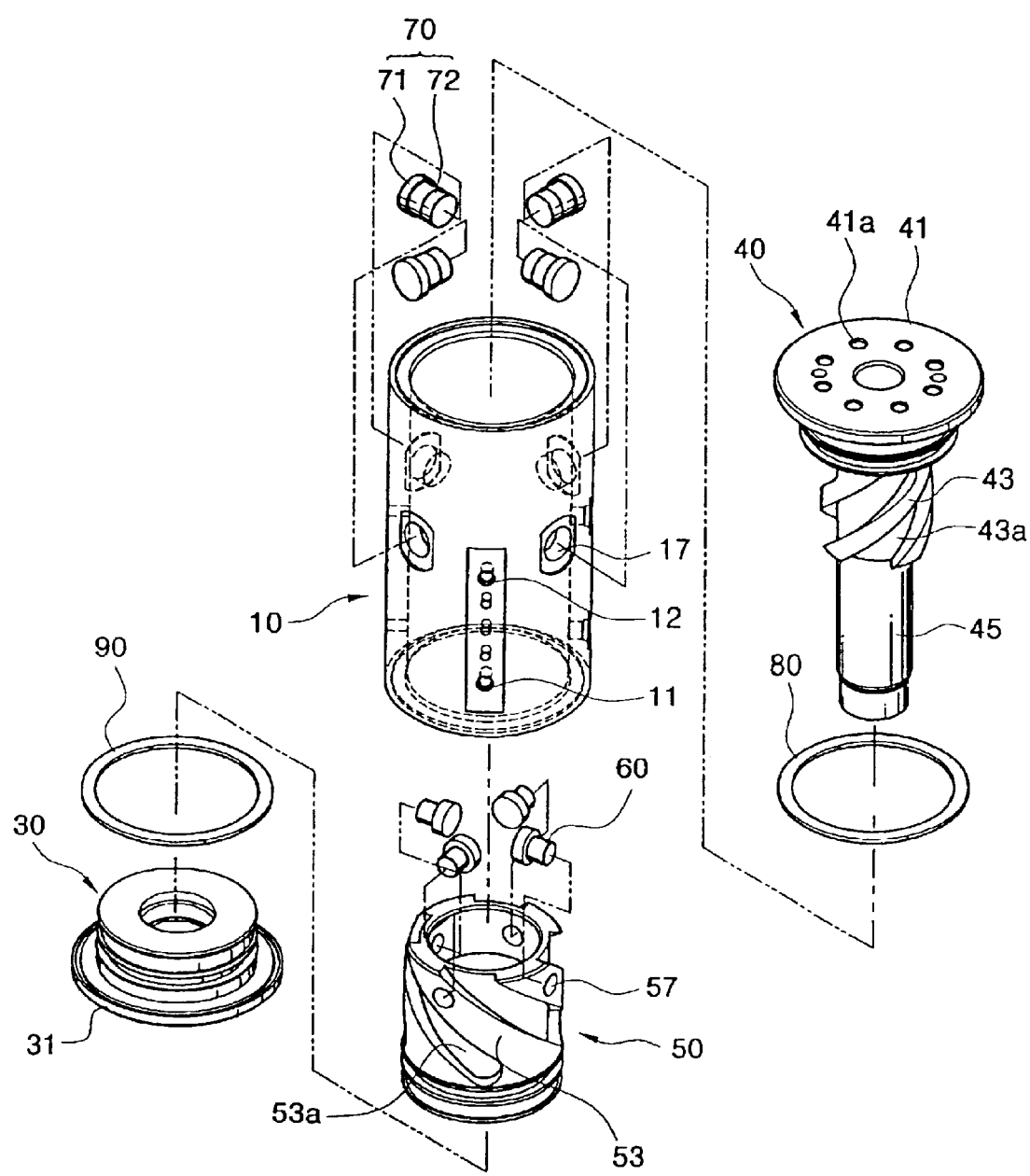
FIG. 1 is an exploded perspective view illustrating a rotary actuator according to a preferred embodiment of the present invention.
Figure 2A:
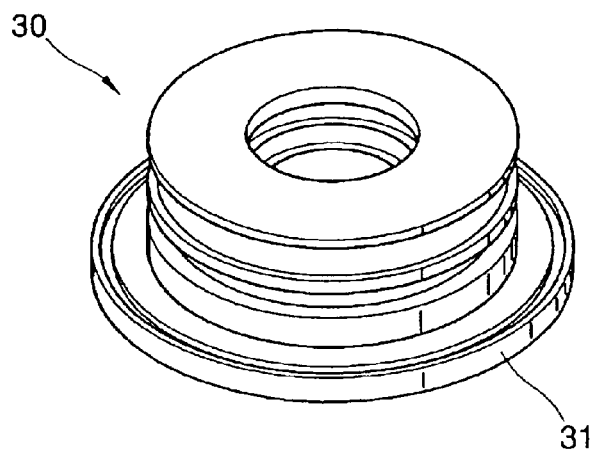
FIG. 2A is a perspective view illustrating an end cap of FIG. 1.
Figure 2B:
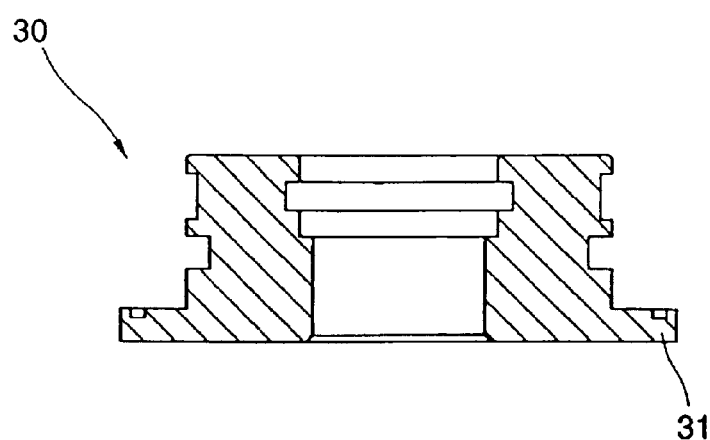
FIG. 2B is a side view of the end cap shown in FIG. 2A.
Figure 3A:
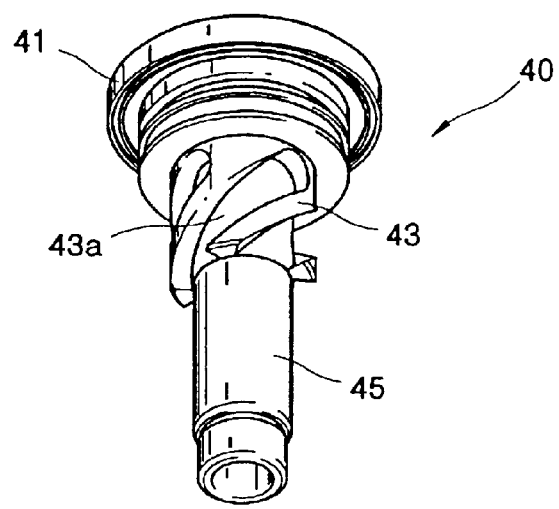
FIG. 3A is a perspective view illustrating an axle rod of FIG. 1.
Figure 3B:
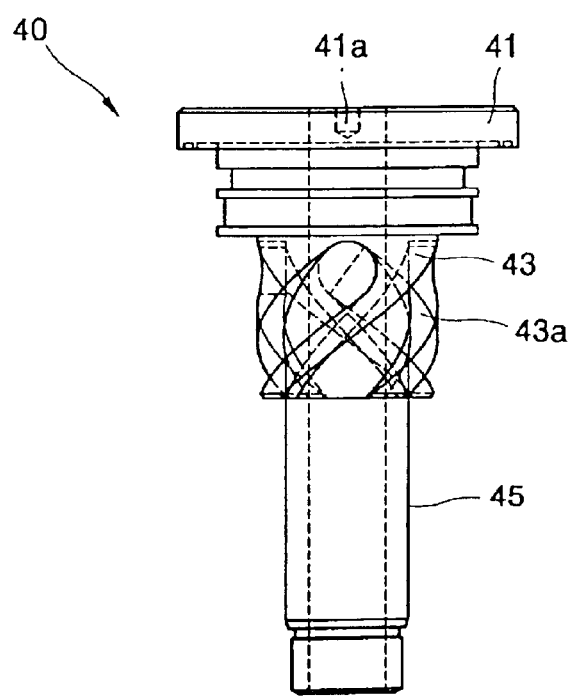
FIG. 3B is a side view of the axle rod shown in FIG. 3A.
Figure 4A:
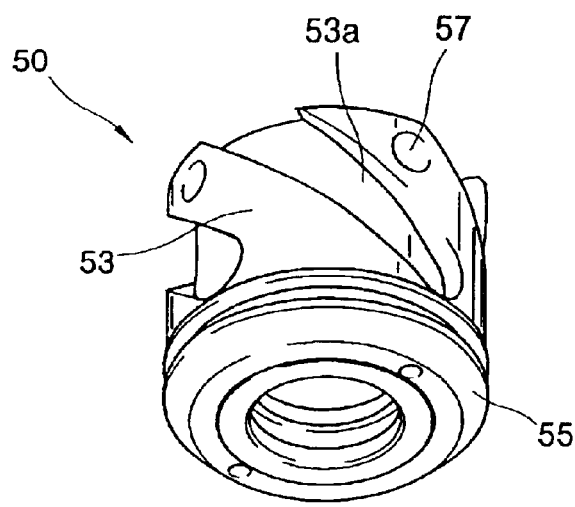
FIG. 4A is a perspective view illustrating a piston of FIG. 1.
Figure 4B:
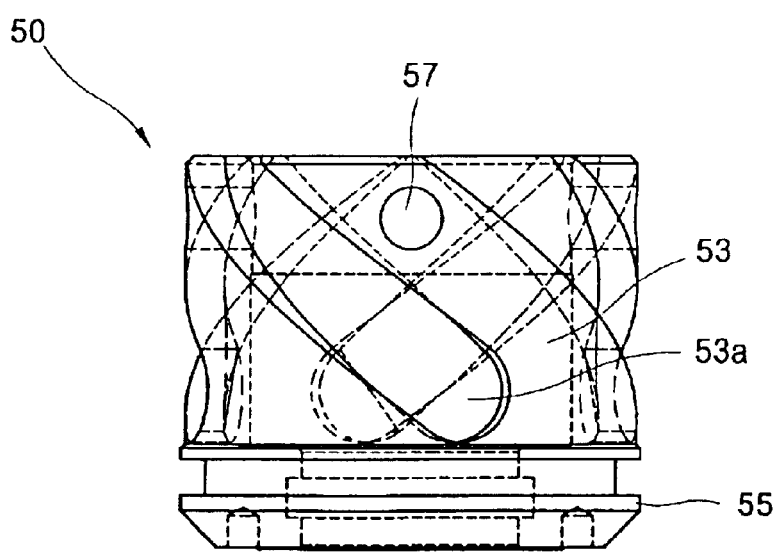
FIG. 4B is a side view of the piston of FIG. 4A.

Referring to FIGS. 1 through 5B, a rotary actuator according to a preferred embodiment of the present invention includes a tube 10, an end cap 30 couple to the tube 10, an axle rod 40 rotatably installed at the tube 10 and the end cap 30, and a piston 50 moving inside the tube 10. The piston 50 and the axle rod 40 are connected by a first pin 60. The tube 10 and the piston 50 are connected by a second pin 70.

The tube 10 has a first hydraulic port 11 and a second hydraulic port 12 through which oil enters and exhausts are separated a predetermined distance from each other. At least two tube through holes are formed between the first and second hydraulic ports 11 and 12. In the present preferred embodiment, four tube through holes 17 are formed symmetrically.

The end cap 30 is fixedly coupled to one end portion of the tube 10 by being inserted therein, as shown in FIGS. 1, 2A, 2B, and 5A. For example, a first flange portion 31 fixed to a first platform (not shown) of a ladder truck is formed at the end cap 30. An installation hole (not shown) is formed in the first flange portion 31 and a bolt (not shown) coupled to the first platform is inserted in the installation hole.

The axle rod 40, as shown in FIGS. 1, 3A, 3B, and 5A, includes a second flange portion 41 installed at a second platform (not shown) of the ladder truck which is rotated with respect to the first platform, a slant groove rod 43 disposed in one side of the tube 10 and having at least two first slant grooves, preferably, four first slant grooves 43a in the present preferred embodiment, formed at an outer circumferential surface thereof to be inclined in one side, and a shaft rod 45 disposed at the other side of the tube 10 and sliding coupled to the end cap 30. A plurality of installation holes 41a are formed in the second flange portion 41 and bolts (not shown) to be coupled to the second platform are inserted therein.

The piston 50, as shown in FIGS. 1, 4A, 4B, and 5A, includes a piston head 55 disposed between the shaft rod 45 of the axle rod 40 and the tube 10 between the first and second hydraulic ports 11 and 12, and a slant groove body 53 disposed between the tube 10 and the slant groove rod 43. At least two second slant grooves, preferably, four two slant groves 53a in the present preferred embodiment, are formed on an outer circumferential surface of the slant groove body 53 in the direction opposite to the first slant grooves 43a. Also, at least two piston pin holes, preferably, four piston pin holes 57 in the present preferred embodiment, are formed at one side of the slant groove body 53.

The first pin 60 fixedly installed in the piston pin hole 57 is inserted in the first slant groove 43a of the axle rod 40. A material exhibiting a superior lubrication feature to smoothly perform a relative motion in the first slant groove 43a so as to be used without injection of a lubricant, and having a superior endurance feature, must be selected as the first pin 60. Since the first pin 60 moves together with the piston 50 moving in the tube 10, the first pin 60 moves along the first slant groove 43a so that the axle rod 40 is rotated with respect to the piston 50.

The second pin 70 fixedly installed in the tube through hole 17 is inserted in the second slant groove 53a of the piston 50. The second pin 70 includes a pin end portion 72 inserted in the second slant groove 53a by penetrating the tube through hole 17 from the outside of the tube 10, and a pin head 71 formed to be stepped from the pin end portion 72 and hooked by the tube through hole 17. A material exhibiting a superior lubrication feature to smoothly perform a relative motion in the second slant groove 53a so as to be used without injection of a lubricant, and having a superior endurance feature, must be selected as the second pin 70. Since the pin end portion 72 of the second pin 70 fixed to the tube 10 is inserted in the second slant groove 53a, when the piston 50 on which the second slant groove 53a is formed moves in the tube 10, the piston 50 is rotated in the tube 10.

In the meantime, slide rings 90 and 80, as shown in FIG. 1, or well-known thrust bearings (not shown), are installed between the first flange portion 31 and the tube 10 and between the second flange portion 41 and the tube 10. A material exhibiting a superior lubrication feature so as to be used without injection of a lubricant must be selected as the slide ring. The slide ring or the thrust bearing supports an external force acting in an axial direction of a rotation shaft or a rotation body.

Figure 5A:
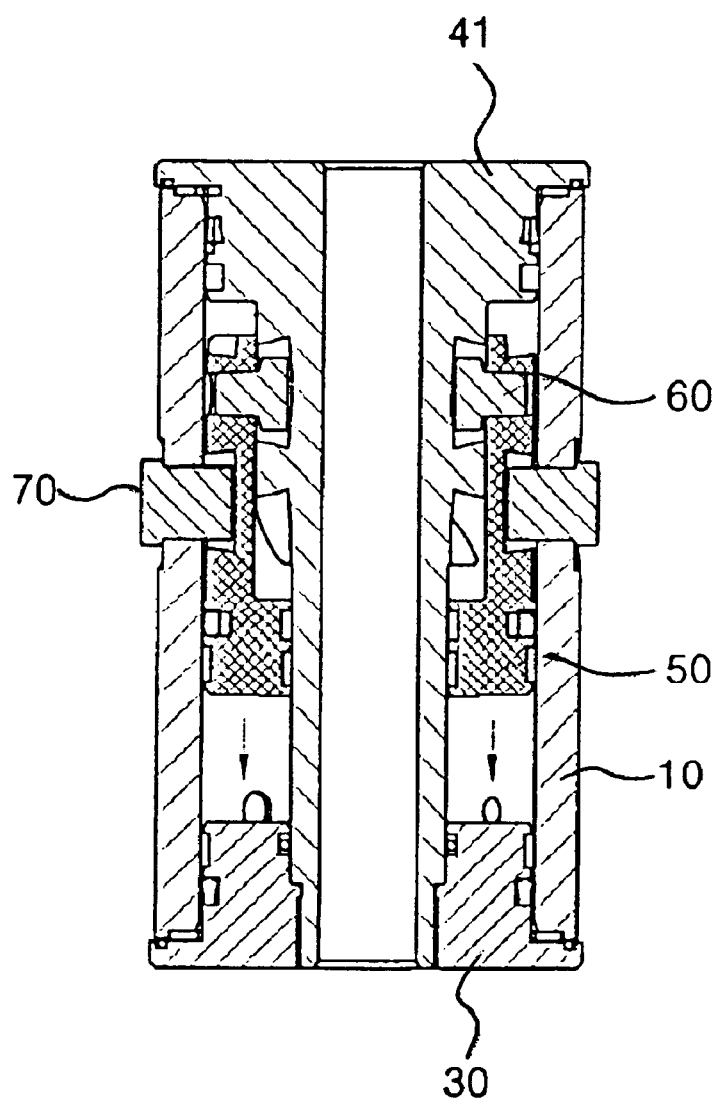
FIG. 5A is a perspective view illustrating a piston of FIG. 1.
Figure 5B:
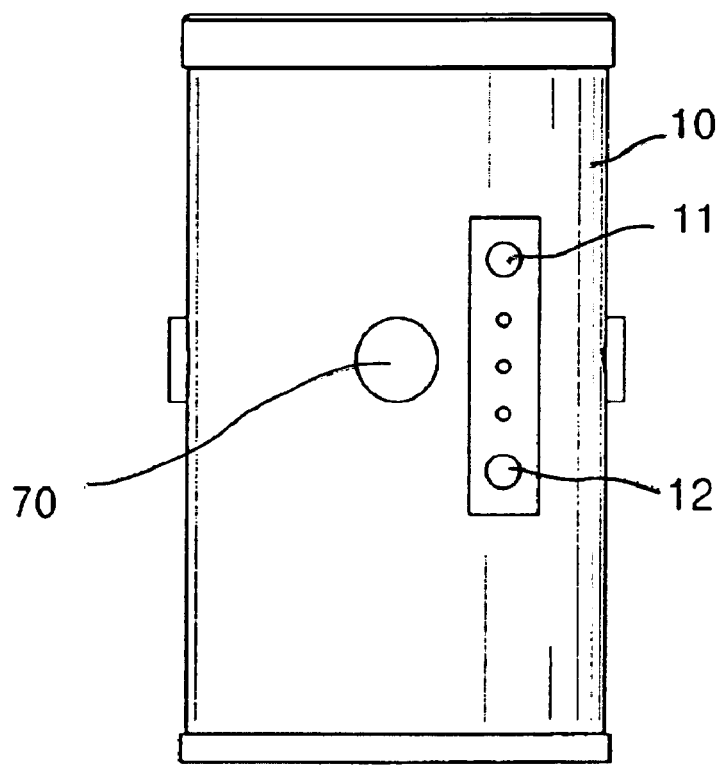
FIG. 5B is a side view of the piston of FIG. 5A.

In the operation of the rotary actuator having the above structure according to the present invention, when oil enters and is exhausted through the first and second hydraulic ports 11 and 12, the piston 50 moves inside the tube 10. For example, when oil enters through the first hydraulic port 11 and is exhausted through the second hydraulic port 12, as shown in FIG. 5A, hydraulic pressure formed between the first and second hydraulic ports 11 and 12 moves the piston 50 downward in a direction as indicated by an arrow.

The first pin 60 fixed to the piston 50 is inserted in the first slant groove 43a of the axle rod 40. The second pin 70 fixed to the tube 10 is inserted in the second slant groove 53a. The directions of the first and second slant grooves 43a and 53a are formed to the opposite to each other. Thus, due to the above coupling structure, when the piston 50 moves, the piston 50, that is, the slant groove body 53, is preliminarily rotated at an angle A with respect to the tube 10. Since the first pin 60 fixed to the piston pin hole 57 is inserted in the first slant groove 43a of the axle rod 40 formed in a direction opposite to that of the second slant groove 53a, when the piston 50 moves and is rotated at the angle A, the axle rod 40 secondarily rotates at an angle B with respect to the piston 50. That is, as the piston 50 moves, the rotation angle of the axle rod 40 with respect to the tube 10 is A+B. As a result, the rotation angel of the axle rod 40, that is, the second flange portion 41, can be increased with respect to a shorter piston movement distance.

In the above rotary actuator, the rotation angel with respect to the tube 10 of the axle rod 40 can be changed by adjusting a slant angle of the first and second slant grooves 43a and 53a.

While this invention has been particularly shown and described with reference to preferred embodiments thereof, it will be understood by those skilled in the art that various changes in form and details may be made therein without departing from the spirit and scope of the invention as defined by the appended claims.

As described above, according to the present invention, by adopting the first slant groove formed in the axle rod and the second slant groove formed in the piston in a direction opposite to that of the first slant groove, the piston and the axle rod are connected by the first pin and the tube and the piston are connected. Thus, a rotary actuator which can realize a great rotation angle although the length thereof is relatively short.

What is claimed is:

1. A rotary actuator comprising:
    a tube having first and second hydraulic ports formed separated a predetermined distance from each other and through which oil enters and is exhausted and at least two tube through holes penetrating a side surface of the tube;
    an end cap coupled to the tube and having a first flange fixed to a predetermined first platform;
    an axle rod including a second flange portion disposed at one side of the tube and fixed to a predetermined second platform to be rotated, a slant groove rod disposed in one portion of the tube and having at least two first slant grooves formed inclined on an outer circumferential surface, and a shaft rod disposed in the other portion of the tube and rotating coupled to the end cap;
    a piston including a piston head disposed between the tube and the axle rod and a slant groove body disposed between the tube and the slant groove rod, wherein at least two second slant grooves are formed on an outer circumferential surface of the slant groove body to be opposite to the direction of the first slant groove and at least two piston pin holes are formed at one side of the slant groove body in a non grooved portion thereof, the piston having a smooth bore extending therethrough;
    a first pin installed at the piston pin hole and inserted in the first slant groove; and
    a second pin including a pin end portion penetrating the tube through hole and inserted in the second slant groove and a pin head formed on the pin end portion to be stepped and inserted in the tube through hole.

2. The rotary actuator as claimed in claim 1, wherein the piston pin holes are symmetrical formed in the slant groove body.

3. The rotary actuator as claimed in claim 1, wherein the tube through holes are symmetrical formed in the tube.

4. The rotary actuator as claimed in claim 1, further comprising sliding rings installed between the first flange portion and the tube and/or between the second flange portion and the tube.

5. The rotary actuator as claimed in claim 1, further comprising thrust bearings installed between the first flange portion and the tube and/or between the second flange portion and the tube.

6. A rotary actuator, comprising:
    a tube defining an axial axis and having at least two holes therein;
    a piston disposed in the tube and configured for displacement along the axial axis, the piston having a bore extending therethrough and aligned with the axial axis, the bore being defined by a smooth inner surface, the piston comprising a spline extending radially outwardly therefrom, the spline being formed by plurality of grooves and a plurality of non-grooved portions, at least some of the non-grooved portions of the spline defining a passageway extending radially inwardly through a side of the piston;

a first set of pins extending radially through the tube to engage the grooves in the spine of the piston;

an axle rod disposed in the bore of the piston, the axle rod having a second spline extending radially outwardly therefrom; and a second set of pine each positioned through a passageway through the piston to engage the second spline.

7. The rotary actuator of 6, wherein the second set of pins are positioned in the piston so that the second set of pins is flush with the non-grooved portions of the spline.

8. The rotary actuator of 6, wherein the second spline has a second plurality of grooves that extend about the axial axis in an opposite direction from the plurality of grooves in the piston.

9. The rotary actuator of 6, wherein the second spline has a second plurality of grooves that extend about the axial axis in an opposite direction from the plurality of grooves in the piston causing the axle rod to undergo increased rotation per linear movement of the piston along the axial axis.

* * * * *